United States Patent
An et al.

(10) Patent No.: US 12,496,881 B2
(45) Date of Patent: Dec. 16, 2025

(54) THERMAL ENERGY MODULE FOR A VEHICLE

(71) Applicants: Hyundai Motor Company, Seoul (KR); Kia Corporation, Seoul (KR); Doowon Heavy Industrial Co., Ltd., Sacheon-si (KR)

(72) Inventors: Hochan An, Hwaseong-si (KR); Yeonho Kim, Seoul (KR); Jeawan Kim, Hwaseong-si (KR); Gwi Taek Kim, Cheonan-si (KR); Man Hee Park, Suwon-si (KR); Yeong Jun Kim, Incheon (KR); Jae Yeon Kim, Hwaseong-si (KR); Hoyoung Jeong, Hwaseong-si (KR); Tea Jin Lee, Pyeongtaek-si (KR)

(73) Assignees: Hyundai Motor Company, Seoul (KR); Kia Corporation, Seoul (KR); Doowon Heavy Industrial Co., Ltd., Sacheon-Si (KR)

( * ) Notice: Subject to any disclaimer, the term of this patent is extended or adjusted under 35 U.S.C. 154(b) by 250 days.

(21) Appl. No.: 18/352,334

(22) Filed: Jul. 14, 2023

(65) Prior Publication Data
US 2024/0270053 A1 Aug. 15, 2024

(30) Foreign Application Priority Data

Feb. 15, 2023 (KR) .................. 10-2023-0019774

(51) Int. Cl.
*B60H 1/32* (2006.01)
*B60H 1/00* (2006.01)

(52) U.S. Cl.
CPC ....... *B60H 1/3229* (2013.01); *B60H 1/00328* (2013.01)

(58) Field of Classification Search
CPC ............ B60H 1/00907; B60H 1/00542; B60H 1/32284; B60H 2001/00928; B60H 2001/00935
(Continued)

(56) References Cited

U.S. PATENT DOCUMENTS 2,106,263 A * 1/1938 Winter .................. A23G 9/225
62/433
2,341,872 A * 2/1944 Kasold ................. F25D 23/126
202/180
(Continued)

FOREIGN PATENT DOCUMENTS

DE 102017126872 B4 * 5/2022 ......... B60H 1/00007
DE 102017221052 B4 * 8/2024 ......... B60H 1/00021
(Continued)

*Primary Examiner* — Ljiljana V. Ciric
(74) *Attorney, Agent, or Firm* — Slater Matsil, LLP

(57) ABSTRACT

A thermal energy module includes a housing having an open first surface and is filled with a refrigerant. Partition walls partition an interior of the housing into a compressing part, a condensing part, and an evaporating part. A compressor is provided in the compressing part. A first heat-exchanger is provided in the condensing part and configured to condense a compressed refrigerant supplied from the compressor by heat-exchange with a coolant. An expansion valve is configured to expand a refrigerant supplied from the condensing part to be supplied to the evaporating part. A second heat-exchanger is provided in the evaporating part and configured to heat-exchange a refrigerant supplied from the expansion valve with the coolant drawn into the interior of the housing to evaporate. A cover mounted on the open first surface of the housing closes and seals the interior of the housing.

20 Claims, 15 Drawing Sheets

(58) Field of Classification Search
USPC ............ 165/75; 62/433, 434, 436, 438, 451, 62/427.1, 501
See application file for complete search history.

(56) References Cited

U.S. PATENT DOCUMENTS

| | | | | |
|---|---|---|---|---|
| 2,383,292 A * | 8/1945 | Dalzell | ............... | F28F 3/12 165/68 |
| 2,550,040 A * | 4/1951 | Clar | ............... | F25D 23/062 285/361 |
| 2,624,182 A * | 1/1953 | Gross | ............... | F25B 35/04 261/95 |
| 2,757,518 A * | 8/1956 | Schofield | ............... | F28F 1/42 165/104.34 |
| 2,979,922 A * | 4/1961 | De Witte | ............... | F25B 39/024 62/526 |
| 3,041,842 A * | 7/1962 | Heinecke | ............... | F04B 39/16 62/93 |
| 3,042,384 A * | 7/1962 | Bauman | ............... | A47B 31/02 219/394 |
| 3,265,301 A * | 8/1966 | Amdur | ............... | G01N 25/56 73/335.07 |
| 3,869,871 A * | 3/1975 | Rybalko | ............... | F25D 3/107 607/104 |
| 3,910,062 A * | 10/1975 | Rojas | ............... | F24F 3/1405 62/96 |
| 4,026,299 A * | 5/1977 | Sauder | ............... | A61F 7/02 607/104 |
| 4,026,351 A * | 5/1977 | Biava | ............... | A47J 39/006 165/47 |
| 4,146,933 A * | 4/1979 | Jenkins | ............... | A41D 13/005 2/458 |
| 4,354,359 A * | 10/1982 | Hall | ............... | F25D 16/00 62/526 |
| 4,607,497 A * | 8/1986 | Ferdows | ............... | B60H 1/00542 62/DIG. 16 |
| 4,662,433 A * | 5/1987 | Cahn | ............... | A47C 21/044 607/104 |
| 4,742,868 A * | 5/1988 | Mitani | ............... | F25B 17/08 62/480 |
| 5,152,336 A * | 10/1992 | Wollaber | ............... | F24F 1/027 62/262 |
| 5,161,389 A * | 11/1992 | Rockenfeller | ............... | F25B 17/083 62/480 |
| 5,186,020 A * | 2/1993 | Rockenfeller | ............... | F28D 20/003 62/480 |
| 5,303,652 A * | 4/1994 | Gasparrini | ............... | B41F 35/06 101/147 |
| 5,335,510 A * | 8/1994 | Rockenfeller | ............... | F25B 17/083 62/480 |
| 5,396,775 A * | 3/1995 | Rockenfeller | ............... | G06F 1/20 62/480 |
| 5,666,819 A * | 9/1997 | Rockenfeller | ............... | G06F 1/20 62/480 |
| 5,855,119 A * | 1/1999 | Pfister | ............... | H01L 23/427 62/480 |
| 6,138,469 A * | 10/2000 | Davidson | ............... | F25D 23/12 257/E23.088 |
| 6,279,337 B1 * | 8/2001 | Davidson | ............... | H05B 6/802 257/E23.088 |
| 6,497,110 B2 * | 12/2002 | Davidson | ............... | H05B 6/808 257/E23.088 |
| 6,587,343 B2 * | 7/2003 | Novotny | ............... | H05K 7/20172 361/698 |
| 6,718,787 B1 * | 4/2004 | Hille | ............... | B60H 1/32331 62/429 |
| 6,828,675 B2 * | 12/2004 | Memory | ............... | F28D 7/0025 257/714 |
| 6,886,358 B2 * | 5/2005 | Hille | ............... | B60H 1/00542 62/244 |
| 7,025,121 B2 * | 4/2006 | Whitehead | ............... | F25D 15/00 165/41 |
| 7,828,048 B2 * | 11/2010 | Dickinson | ............... | G01F 23/02 210/175 |
| 8,092,676 B2 * | 1/2012 | Dickinson | ............... | B01D 35/26 210/172.6 |
| 8,240,165 B2 * | 8/2012 | Novotny | ............... | H05K 7/20354 165/104.31 |
| 9,516,791 B2 * | 12/2016 | Chester | ............... | H05K 7/20281 |
| 9,562,708 B2 * | 2/2017 | Medlock | ............... | F24D 3/1058 |
| 9,739,492 B2 * | 8/2017 | Medlock | ............... | F24D 3/1058 |
| 10,107,508 B2 * | 10/2018 | Medlock | ............... | F24D 7/00 |
| 10,486,500 B2 * | 11/2019 | Kim | ............... | B60H 1/3229 |
| 10,900,675 B2 * | 1/2021 | Medlock | ............... | F24F 3/06 |
| 10,994,584 B2 * | 5/2021 | Kim | ............... | F25B 1/005 |
| 11,214,126 B2 * | 1/2022 | Hötzel | ............... | B60H 1/321 |
| 11,577,580 B2 * | 2/2023 | Jeong | ............... | B60H 1/00278 |
| 11,713,890 B2 * | 8/2023 | Medlock | ............... | F24D 7/00 165/218 |
| 12,117,200 B2 * | 10/2024 | Medlock | ............... | F24D 7/00 |
| 12,246,578 B2 * | 3/2025 | Jeong | ............... | B60H 1/00664 |
| 2002/0029877 A1 * | 3/2002 | Cowans | ............... | F25D 17/02 165/206 |
| 2005/0028543 A1 * | 2/2005 | Whitehead | ............... | F25D 15/00 62/408 |
| 2024/0270053 A1 * | 8/2024 | An | ............... | B60H 1/00328 |

FOREIGN PATENT DOCUMENTS

EP             989795 A2 *   3/2000  ............. F25B 17/08
WO    WO-2017200551 A1 *  11/2017  ......... H05K 7/20363

* cited by examiner

THERMAL ENERGY MODULE FOR A VEHICLE

CROSS-REFERENCE TO RELATED APPLICATIONS

This application claims the benefit of Korean Patent Application No. 10-2023-0019774, filed on Feb. 15, 2023, which application is hereby incorporated herein by reference.

TECHNICAL FIELD

The present disclosure relates to a thermal energy module for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally-friendly vehicle capable of substantially substituting for an internal combustion engine vehicle is required, and the environmentally-friendly vehicle is classified into an electric vehicle driven using a fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling system, a heat pump system, and a battery cooling system, respectively, should be configured as separate closed circuits so as to prevent heat generation of the motor, an electric component, and the battery including a fuel cell.

Therefore, a size and a weight of a cooling module positioned at the front of the vehicle are increased, and a layout of connection pipes supplying a refrigerant and a coolant to each of the heat pump system, the cooling system, and the battery cooling system in a narrow space becomes complicated.

In order to compensate for these problems, there has recently been a demand for technology development for packaging a compressor, an evaporator, a condenser, and an expansion valve that phase-change the refrigerant into a single device or module.

The above information disclosed in this Background section is only for enhancement of understanding of the background of the disclosure, and therefore it may contain information that does not form the prior art that is already known in this country to a person of ordinary skill in the art.

SUMMARY

The present disclosure relates to a thermal energy module for a vehicle. More particularly, the present disclosure relate to a thermal energy module for a vehicle capable of cooling or heating the vehicle interior by using thermal energy of the refrigerant phase-changed through heat-exchange with the coolant while circulating components without a separate delivery pipe.

The present disclosure attempts to provide a thermal energy module for a vehicle capable of selectively heat-exchanging the coolant with thermal energy generated from the refrigerant at the time condensation and evaporation of the refrigerant that circulates without a separate connection pipe and adjusting the vehicle interior temperature by using the heat-exchanged low temperature or high temperature coolant.

In an embodiment, a thermal energy module for a vehicle includes a housing having an open first surface and filled with a refrigerant, a partition wall configured to partition an interior of the housing into a compressing part, a condensing part, and an evaporating part, a compressor provided in the compressing part and configured to compress the refrigerant, a first heat-exchanger provided in the condensing part and configured to condense a compressed refrigerant supplied from the compressor by heat-exchange with a coolant, an expansion valve mounted on an outer side of the housing and configured to expand a refrigerant supplied from the condensing part to be supplied to the evaporating part, a second heat-exchanger provided in the evaporating part and configured to heat-exchange a refrigerant supplied from the expansion valve with the coolant drawn into an interior to evaporate, and a cover mounted on the open first surface of the housing and configured to close and seal the interior of the housing.

The partition wall may be mounted on a base plate mounted on a bottom surface in the interior of the housing.

The partition wall may include a first partition wall formed along a length direction of the housing and configured to partition the interior of the housing in a width direction to form the condensing part, and a second partition wall formed along the width direction of the housing from the first partition wall, and configured to partition the interior of the housing in the length direction to form the compressing part and the evaporating part, and a third partition wall formed to interconnect upper portions of the first partition wall and the second partition wall in the compressing part.

A penetration hole may be formed in the upper portion of the second partition wall, to flow the refrigerant evaporated in the evaporating part to the compressing part.

The condensing part may further include at least one first separating plate mounted in an opposite direction of the compressing part through the first partition wall and configured to partition the condensing part into a heat-exchange space and a collecting space with respect to the length direction of the housing.

The at least one first separating plate may be configured as a pair of first separating plates positioned apart from each other to allow flowing the refrigerant.

Among the pair of first separating plates, a lower portion of one first separating plate positioned facing the compressor may be formed with a connection hole to draw the refrigerant from the heat-exchange space. An upper portion of another first separating plate among the pair of first separating plates may be formed with a discharging hole to discharge the refrigerant to the collecting space.

The collecting space may be provided with a dehumidifier configured to remove moisture of the refrigerant drawn from the heat-exchange space.

The evaporating part may further include a second separating plate mounted through the first partition wall and the second partition wall and configured to partition the evaporating part into an upper space and a lower space with respect to a height direction of the housing.

An insertion hole into which the second heat-exchanger may be inserted is formed in a center of the second separating plate.

The second separating plate may be inclinedly mounted within the evaporating part, and the refrigerant in the gas state may be located in the upper space, and the refrigerant in the liquid state is located in the lower space, thereby preventing the refrigerant in the liquid state from flowing to the compressor.

A guider may be mounted between the partition wall and the cover in an upper portion of the partition wall, to interconnect the compressing part and condensing part, and configured to flow the refrigerant compressed in the compressor to the condensing part.

The first heat-exchanger may include a plurality of first cooling tubes positioned apart by a predetermined interval along a length direction in an interior of the condensing part, and configured to interiorly flow the coolant, a first inlet pipe protruding toward the outer side of the housing and configured to communicate with interiors of the first cooling tubes in a state having penetrated the first cooling tubes to supply the coolant to the interiors of the first cooling tubes, respectively, and a first exhaust pipe protruding toward the outer side of the housing and configured to communicate with the interiors of the first cooling tubes in a state having penetrated the first cooling tubes to discharge the coolant having passed through the first cooling tubes.

The first inlet pipe may be located on a first edge portion in a lower portion of the first cooling tube, and the first exhaust pipe may be located on a second edge portion in an upper portion of the first cooling tube, to face opposite to the first inlet pipe.

The second heat-exchanger may include a second cooling tube positioned apart by a predetermined interval along a length direction in an interior of the evaporating part, and configured to interiorly flow the coolant, a second inlet pipe protruding toward the outer side of the housing and configured to communicate with interiors of the second cooling tubes in a state having penetrated the second cooling tubes to supply the coolant to the interiors of the second cooling tubes, respectively, and a second exhaust pipe protruding toward the outer side of the housing and configured to communicate with the interiors of the second cooling tubes in a state having penetrated the second cooling tubes to discharge the coolant having passed through the second cooling tubes.

The second inlet pipe may be located on a first edge portion in an upper portion of the second cooling tube, and the second exhaust pipe may be located on a second edge portion in a lower portion of the second cooling tube, to face opposite to the second inlet pipe.

The housing, the cover, and the partition wall may be formed of a heat shielding material.

The refrigerant filled in the housing may be prevented by the cover from being leaked to an outside from the housing, and configured to interiorly circulate to sequentially pass through the compressing part, the condensing part, the expansion valve, and the evaporating part.

The first heat-exchanger and the second heat-exchanger may be connected to a heating, ventilation, and air conditioning (HVAC) module through a coolant pipe, and the high-temperature coolant having heat-exchanged while passing through the first heat-exchanger may be supplied to the HVAC module to heat the vehicle interior, when a heating mode of a vehicle interior is operated.

When a cooling mode of the vehicle interior is operated, the low-temperature coolant having heat-exchanged while passing through the second heat-exchanger may be supplied to the HVAC module to cool the vehicle interior.

According to a thermal energy module 100 for a vehicle according to an exemplary embodiment, the thermal energy generated by the refrigerant during the condensation and evaporation of the refrigerant is selectively heat-exchanged with the coolant, and the vehicle interior temperature is adjusted by using the heat-exchanged low-temperature or high-temperature coolant, thereby capable of streamlining the entire system.

In addition, in an embodiment of the present disclosure, by interiorly circulating the refrigerant without a separate connection pipe to minimize pressure loss that may occur due to flowing of the refrigerant, the thermal energy loss occurring in phase-changing of the refrigerant may be minimized, and the efficiency of the entire system may be enhanced.

In addition, in an embodiment, it is possible to reduce manufacturing cost and weight through modularization of an apparatus, and to improve space utilization.

DETAILED DESCRIPTION OF ILLUSTRATIVE EMBODIMENTS

Figure 1:
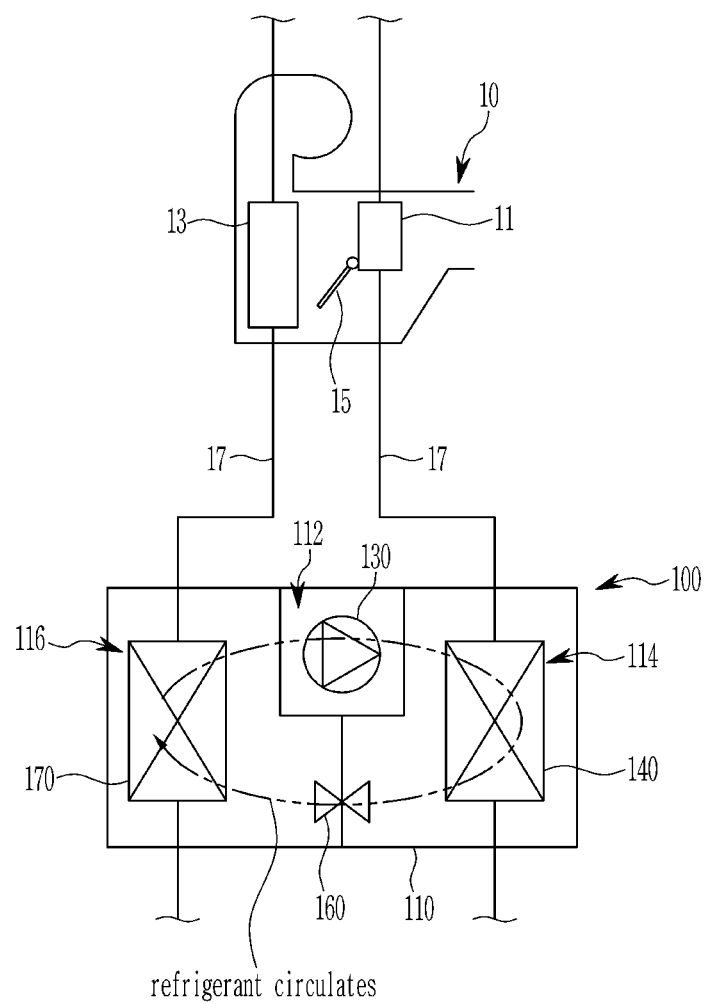
FIG. 1 is a schematic diagram of a thermal energy module for a vehicle according to an exemplary embodiment.

Exemplary embodiments will hereinafter be described in detail with reference to the accompanying drawings. Exemplary embodiments disclosed in the present specification and the constructions depicted in the drawings are only the preferred embodiments of the present disclosure, and do not cover the entire scope of the present disclosure. Therefore, it will be understood that there may be various equivalents and variations at the time of the application of this specification.

To clarify the present disclosure, parts that are not related to the description may be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., may be exaggerated for clarity.

In addition, unless explicitly described to the contrary, the words "comprise," "include," and variations such as "comprises," "comprising," "includes," or "including" will be understood to imply the inclusion of stated elements but not the exclusion of any other elements.

Furthermore, each of terms, such as " . . . unit," " . . . means," " . . . portions," " . . . part," and " . . . member" described in the specification, mean a unit of a comprehensive element that performs at least one function or operation.

FIG. 1 is a schematic diagram of a thermal energy module 100 for a vehicle according to an exemplary embodiment.

The thermal energy module 100 for a vehicle according to an exemplary embodiment is applied to a heat pump system. The thermal energy module 100 may be configured to selectively heat-exchange a coolant with the thermal energy generated by the refrigerant during the condensation and evaporation of the refrigerant interiorly circulating without a separate connection pipe, and perform cooling or heating of the vehicle by using only the heat-exchanged low-temperature or high-temperature coolant.

Here, the heat pump system may be applied to an electric vehicle. The heat pump system may include the thermal energy module 100 according to an exemplary embodiment, together with a cooling apparatus, a battery module, a heating, ventilation, and air conditioning (HVAC) module 10.

The cooling apparatus may circulate the coolant cooled at a radiator through an operation of a water pump, and thereby cool electrical components so as not to overheat.

The battery module may be connected to the cooling apparatus, to enable the coolant to interiorly circulate through an operation of the water pump, and may supply electrical power to the electrical components.

Referring to FIG. 1, in an embodiment, the HVAC module 10 includes an internal heater 11, a cooler 13, and opening/closing door 15.

The internal heater 11 and the cooler 13 may be connected to the thermal energy module 100 through the coolant pipe 17. In addition, the opening/closing door 15 may be provided between the internal heater 11 and the cooler 13. The opening/closing door 15 may perform adjustment such that an ambient air having passed through the cooler 13 is selectively drawn to the internal heater 11 depending on cooling, heating, and dehumidifying modes of the vehicle.

That is, in a heating mode of the vehicle, the opening/closing door 15 may be opened such that the ambient air having passed through the cooler 13 is drawn to the internal heater 11. To the contrary, in a cooling mode of the vehicle, the opening/closing door 15 may close a side toward the internal heater 11 such that the ambient air cooled while passing through the cooler 13 may be directly drawn into the vehicle interior.

In addition, the thermal energy module 100 according to an exemplary embodiment may be configured to selectively heat-exchange the coolant with the thermal energy generated during the condensation and evaporation of the refrigerant circulating without a separate connection pipe, and supply the heat-exchanged low-temperature or high-temperature coolant to the HVAC module 10.

The refrigerant may be a high-performance R152-a or R744 refrigerant, for example.

When the heating mode of the vehicle is operated, the high-temperature coolant may be supplied from the thermal energy module 100 to the internal heater 11 through the cooling water pipe 17. To the contrary, when the cooling mode of the vehicle is operated, the low-temperature coolant may be selectively supplied from the thermal energy module 100 to the cooler 13 through the coolant pipe 17.

Meanwhile, in an embodiment, it is described that, as an example, the high-temperature coolant may be supplied to the internal heater 11 through the coolant pipe 17, and the low-temperature coolant may be supplied to the cooler 13, but is not limited thereto. A battery module (now shown) may be connected through the coolant pipe 17 such that the temperature of the battery module may be adjusted by using the low-temperature or high-temperature coolant.

Hereinafter, the thermal energy module 100 according to an exemplary embodiment is described with reference to FIG. 2 to FIG. 10.

Figure 2:
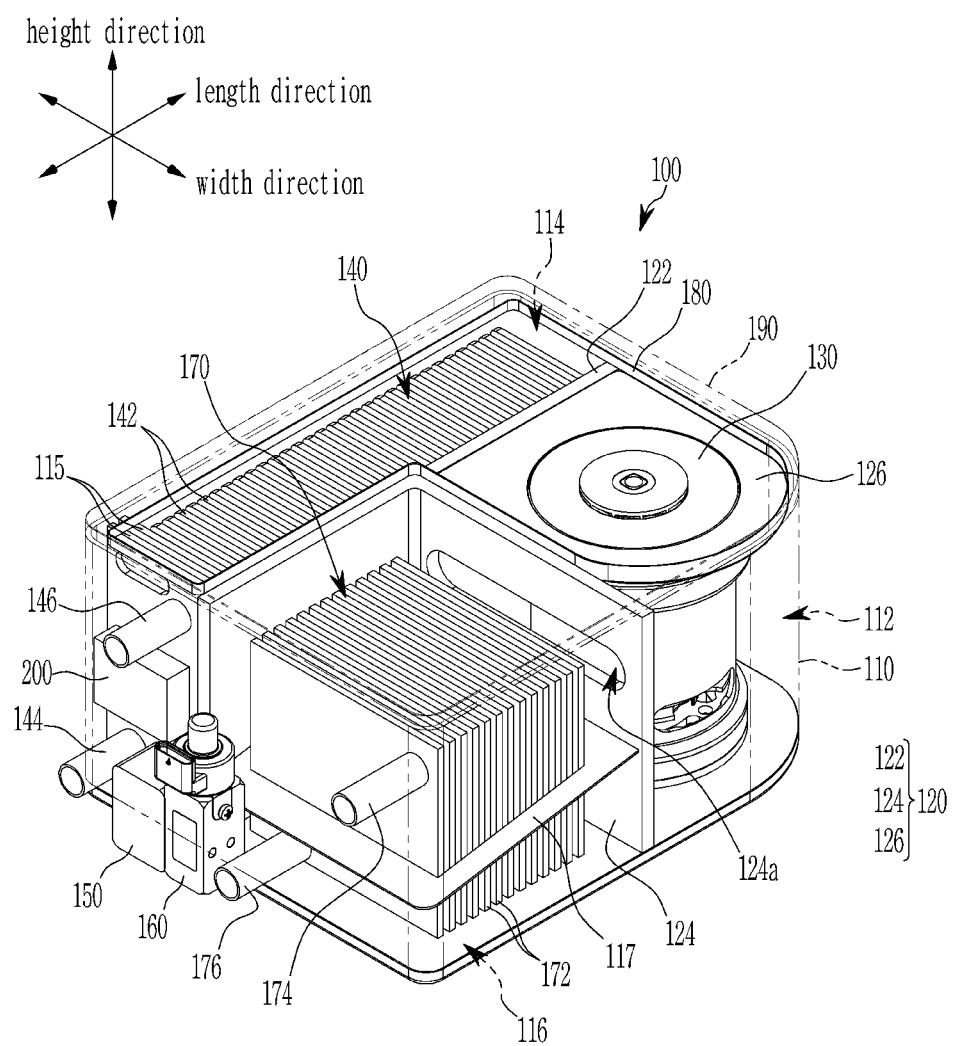
FIG. 2 is a projected perspective view of a thermal energy module for a vehicle according to an exemplary embodiment.
Figure 3:
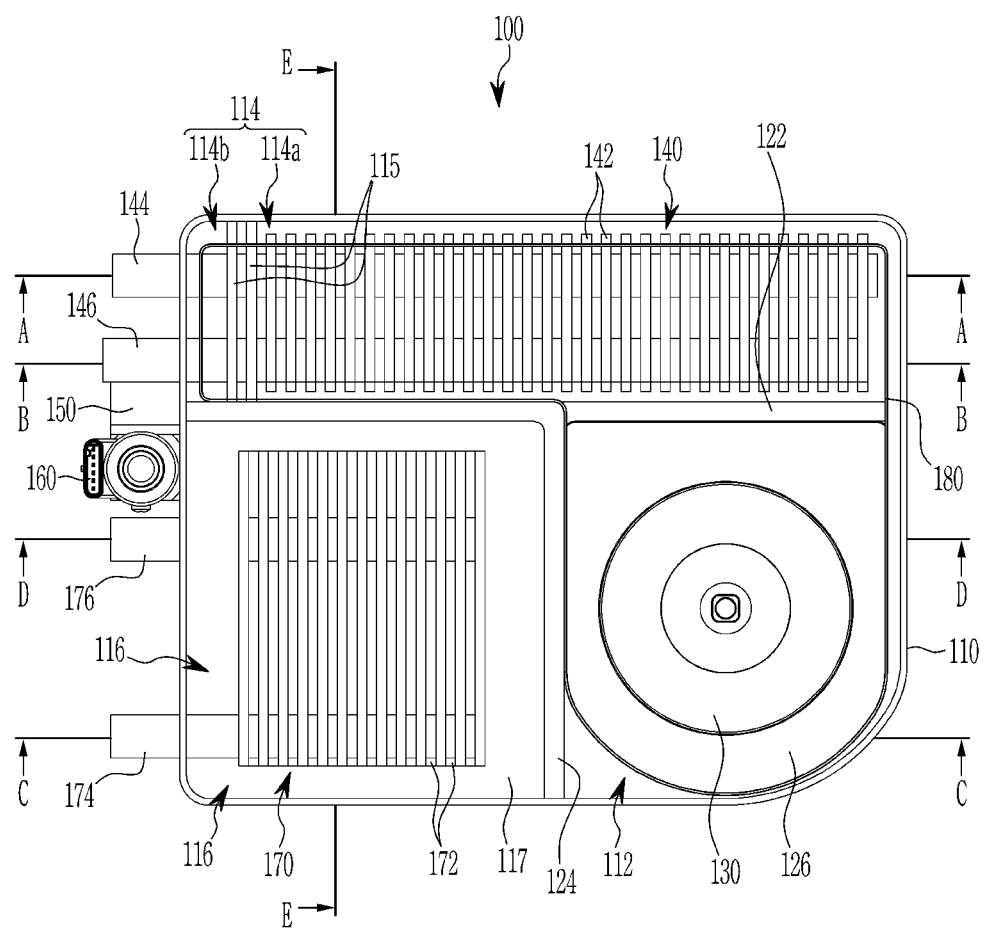
FIG. 3 is a top plan view of a thermal energy module for a vehicle according to an exemplary embodiment.
Figure 4:
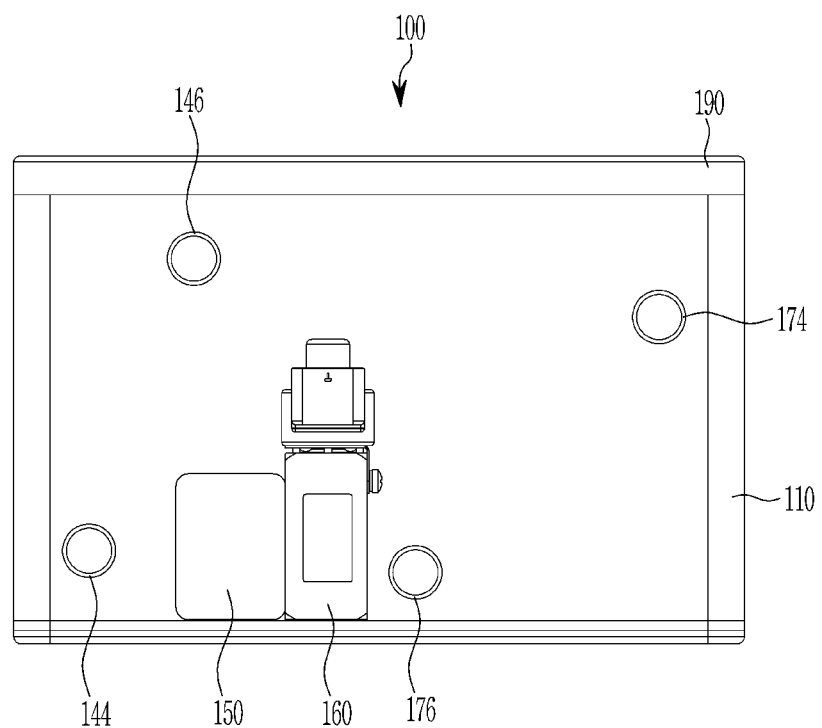
FIG. 4 is a side view of a thermal energy module for a vehicle according to an exemplary embodiment.
Figure 5:
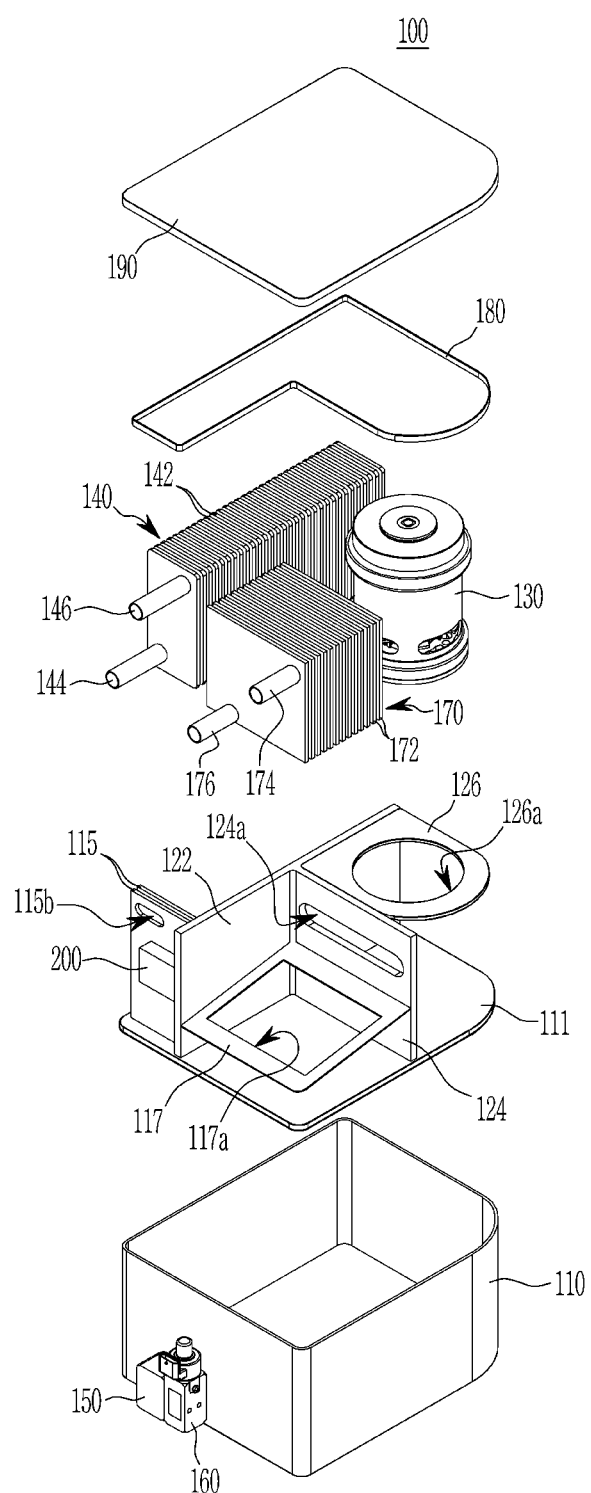
FIG. 5 is an exploded perspective view of a thermal energy module for a vehicle according to an exemplary embodiment.
Figure 6:
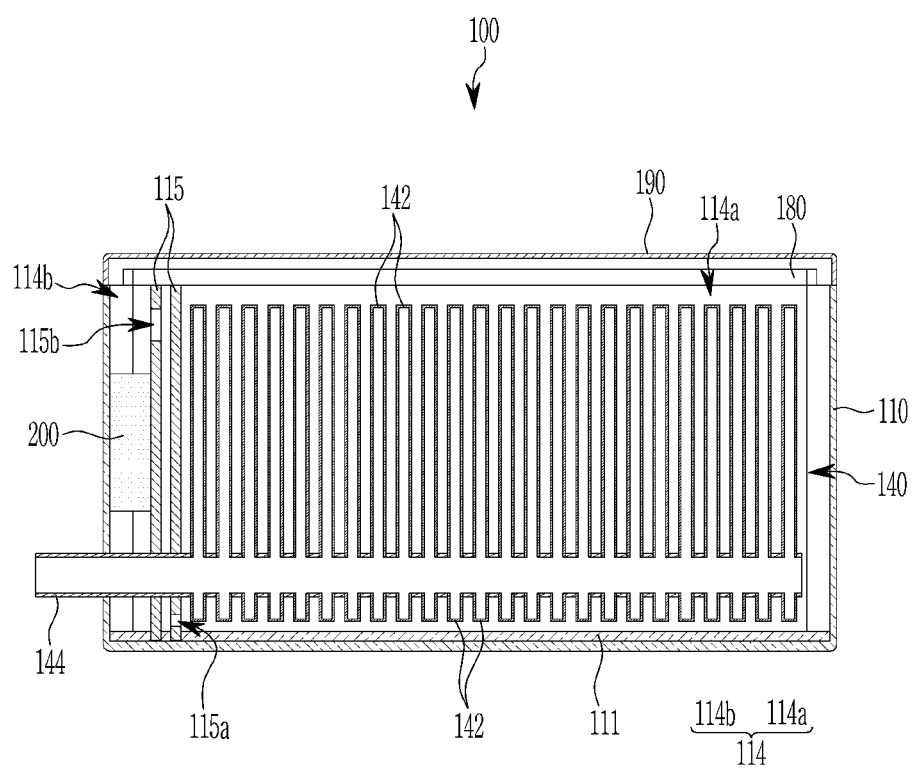
FIG. 6 is a cross-sectional view taken along line A-A of FIG. 3.
Figure 7:
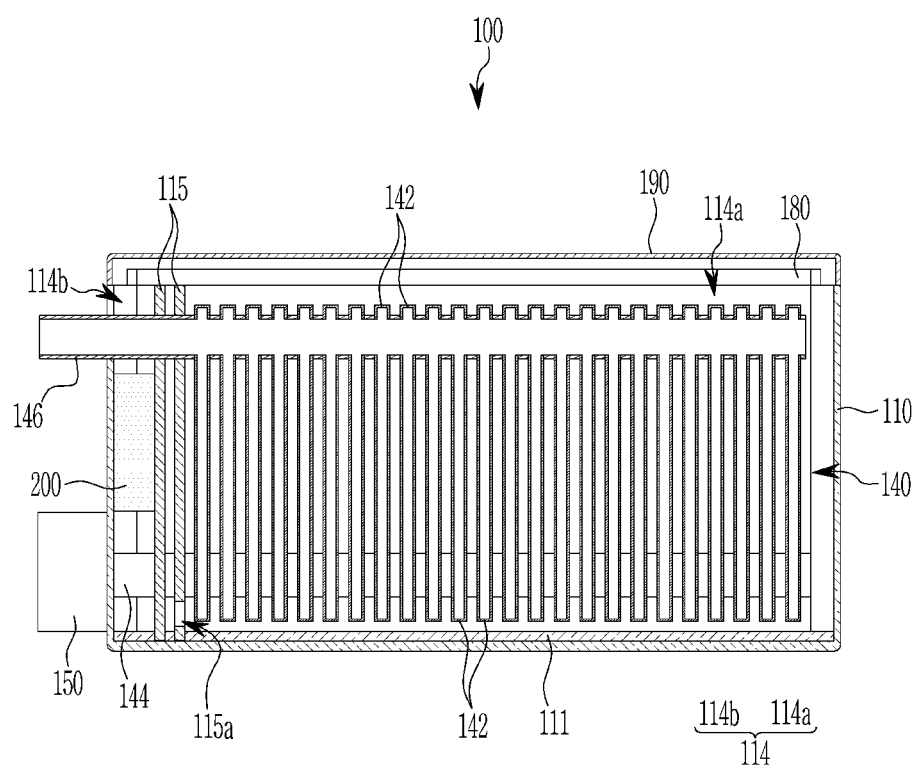
FIG. 7 is a cross-sectional view taken along line B-B of FIG. 3.
Figure 8:
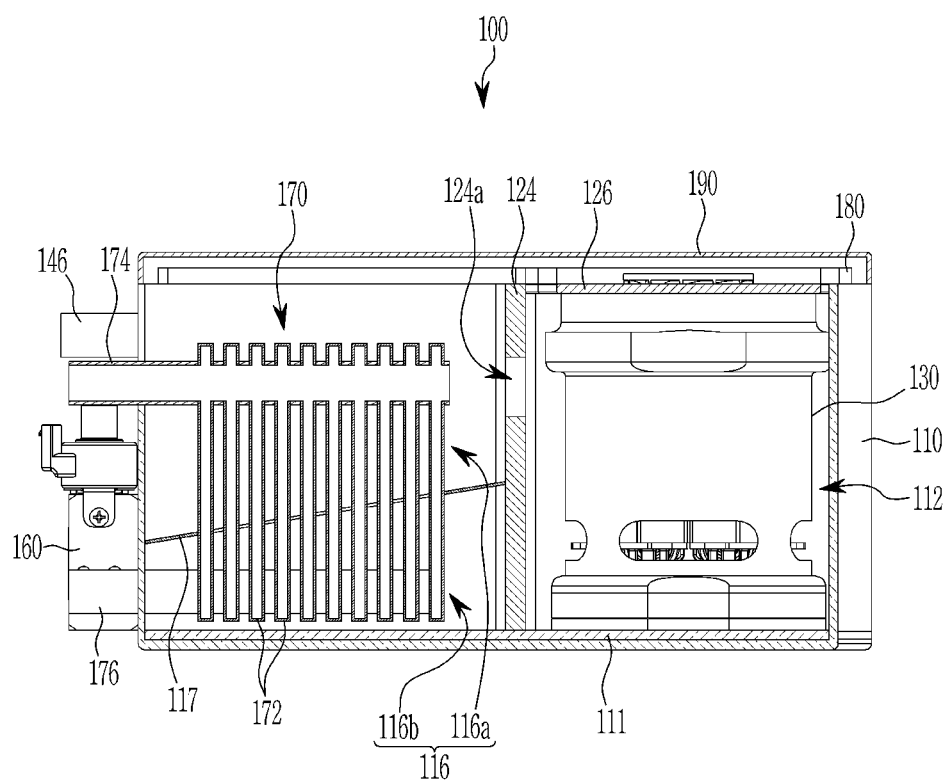
FIG. 8 is a cross-sectional view taken along line C-C of FIG. 3.
Figure 9:
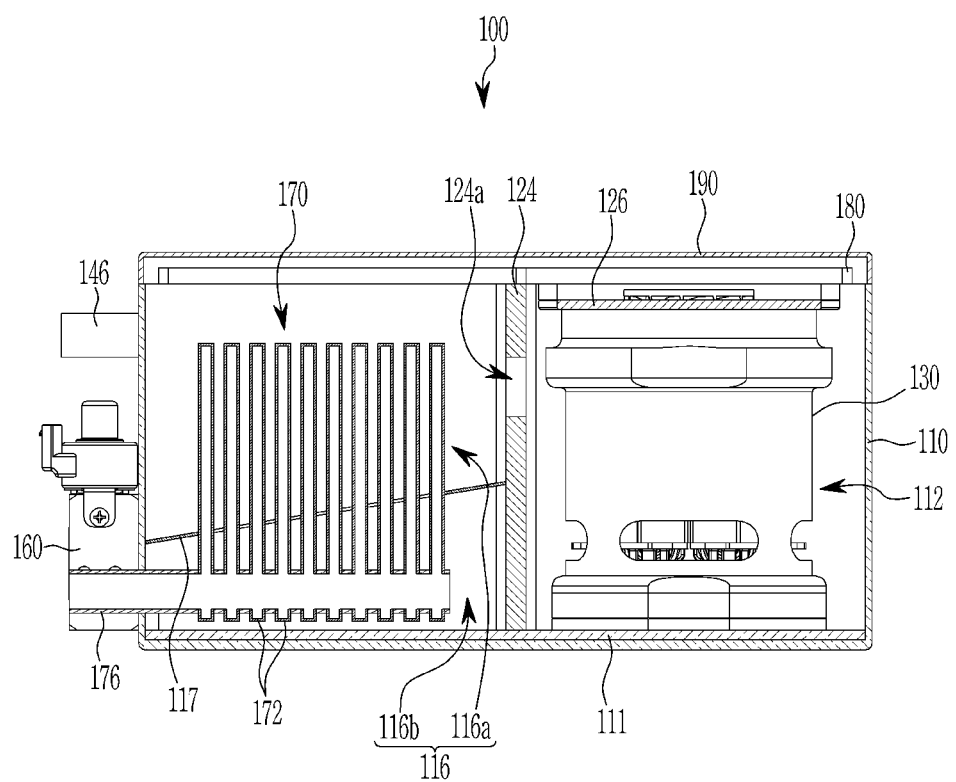
FIG. 9 is a cross-sectional view taken along line D-D of FIG. 3.
Figure 10:
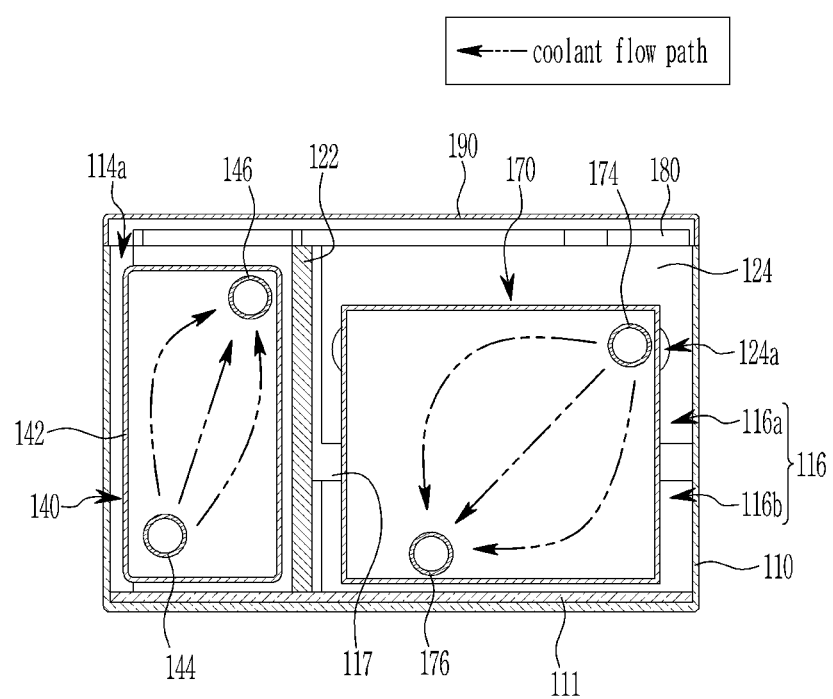
FIG. 10 is a cross-sectional view taken along line E-E of FIG. 3.

FIG. 2 is a projected perspective view of a thermal energy module 100 for a vehicle according to an exemplary embodiment. FIG. 3 is a top plan view of a thermal energy module 100 for a vehicle according to an exemplary embodiment. FIG. 4 is a side view of a thermal energy module 100 for a vehicle according to an exemplary embodiment. FIG. 5 is an exploded perspective view of a thermal energy module 100 for a vehicle according to an exemplary embodiment. FIG. 6 is a cross-sectional view taken along line A-A of FIG. 3. FIG. 7 is a cross-sectional view taken along line B-B of FIG. 3. FIG. 8 is a cross-sectional view taken along line C-C of FIG. 3. FIG. 9 is a cross-sectional view taken along line D-D of FIG. 3. FIG. 10 is a cross-sectional view taken along line E-E of FIG. 3.

In an embodiment, as shown in FIG. 2 to FIG. 10, the thermal energy module 100 may include a housing 110, a partition wall 120, a compressor 130, a first heat-exchanger 140, a connection block 150, an expansion valve 160, a second heat-exchanger 170, and a cover 190.

First, the housing 110 may be formed in a substantially rectangular box shape, and may have an open first surface. The refrigerant may be filled in the housing 110.

The partition wall 120 may partition the interior of the housing 110 into a compressing part 112, a condensing part 114, and an evaporating part 116.

The partition wall 120 may be mounted on a base plate 111 mounted on a bottom surface in the interior of the housing 110. The base plate 111 may be formed in a same shape with the bottom surface of the housing 110.

Here, the partition wall 120 may include a first partition wall 122, a second partition wall 124, and a third partition wall 126.

First, the first partition wall 122 may be formed along a length direction of the housing 110, and may partition the interior of the housing 110 in width direction to form the condensing part 114.

The second partition wall 124 may be formed along a width direction of the housing 110 extending from the first partition wall 122, and may partition the interior of the housing 110 in length direction to form the compressing part 112 and the evaporating part 116.

Here, a penetration hole 124a may be formed on the second partition wall 124 such that the refrigerant evaporated in the evaporating part 116 may flow to the compressing part 112.

The penetration hole 124a may be located in an upper portion of the second partition wall 124, such that, among the refrigerant evaporated in the evaporating part 116, only the refrigerant in the gas state positioned in an upper portion of the evaporating part 116 by its own weight may be drawn to the compressing part 112.

In addition, the third partition wall 126 may be formed to interconnect upper portions of the first partition wall 122 and the second partition wall 124 in the compressing part 112.

A fixing hole 126a may be formed on the third partition wall 126 to fix the compressing part 112 in a state that an upper portion of the compressing part 112 protrudes above the third partition wall 126.

Accordingly, an upper portion of the compressor 130 may be fixed in a state protruding above the fixing hole 126a. In addition, a lower portion of the compressor 130 may be mounted on the base plate 111.

In an embodiment, the condensing part 114 may further include a first separating plate 115 mounted in an opposite direction of the compressing part 112 through the first partition wall 122 and configured to partition the condensing part 114 into a heat-exchange space 114a and a collecting space 114b with respect to the length direction of the housing 110.

The first separating plate 115 may be configured as a pair positioned apart from each other to allow flowing the refrigerant.

In addition, among the first separating plate 115, a lower portion of one first separating plate 115 positioned toward the compressor 130 may be formed with a connection hole 115a to draw the refrigerant from the heat-exchange space 114a.

In addition, an upper portion of another first separating plate 115 may be formed with a discharging hole 115b to discharge the refrigerant to the collecting space 114b (refer to FIG. 6 to FIG. 7).

Accordingly, the refrigerant condensed by the first heat-exchanger 140 in the heat-exchange space 114a of the condensing part 114 may be drawn to the connection hole 115a formed on the first separating plate 115.

The refrigerant drawn to the connection hole 115a may flow upward in a space formed by a pair of spaced apart first separating plates 115, toward the discharging hole 115b. Thereafter, the condensed refrigerant may be discharged through the discharging hole 115b, and collected in the collecting space 114b.

A dehumidifier 200 may be provided in the collecting space 114b such that to moisture of the refrigerant may be reduced or removed after the refrigerant is drawn from the heat-exchange space 114a. The dehumidifier 200 may be implemented as a known device in the field, or may contain a known chemical agent to remove the moisture.

In the present embodiment, it is described that the refrigerant flows downward from an upper portion to a lower portion of the condensing part 114, but it is not limited thereto.

That is, at least one induction plate for controlling the flowing movement of the refrigerant may be mounted in an interior of the condensing part 114, to flow the refrigerant in a zigzag manner along the length direction of the housing 110 when the refrigerant drawn from the compressing part 112 to the upper portion of the condensing part 114 flows downward from the upper portion to the lower portion of the condensing part 114.

That is, the induction plate may be configured in a quantity of at least one, and may partition the condensing part 114 in multiple stages along a height direction.

In this case, when the refrigerant drawn from the compressing part 112 to the upper portion of the condensing part 114 flows downward from the upper portion to the lower portion of the condensing part 114, the refrigerant may be efficiently heat-exchanged with the coolant drawn into the first heat-exchanger 140 while flowing in the zigzag manner toward first and second sides along the length direction of the housing 110 by the at least one induction plate.

In addition, in the present embodiment, the condensing part 114 is not partitioned along a height direction of the housing, but is not limited thereto. The condensing part 114 may be partitioned by a separate space separating plate into an upper portion and a lower portion.

That is, the condensing part 114 may include a first heat dissipating portion positioned in the upper space partitioned by the space separating plate and configured to primarily condense the refrigerant supplied from the compressing part 114 and a second heat dissipating portion connected to the collecting space, and configured to secondarily condense the refrigerant collected in the collecting space 114b.

The low-temperature coolant supplied to the first heat-exchanger 140 may first pass through the second heat dissipating portion. Then, the refrigerant primarily condensed in the second heat dissipating portion may be secondarily heat-exchanged with the drawn low-temperature coolant, and accordingly the cooling efficiency may be enhanced to increase condensation rate.

Accordingly, the condensing part 114 may be applied with the second heat dissipating portion, to further decreasing the temperature of the refrigerant condensed while passing through the first heat dissipating portion, thereby inducing sub-cooling, to increase an overall condensation rate of the refrigerant.

In the present embodiment, the evaporating part 116 may further include a second separating plate 117 mounted through the first partition wall 122 and the second partition wall 124 and configured to partition the evaporating part 116 into an upper space 116a and a lower space 116b with respect to the height direction of the housing 110.

An insertion hole 117a into which the second heat-exchanger 170 may be inserted may be formed in a center of the second separating plate 117.

The second separating plate 117 may be inclinedly mounted within the evaporating part 116 (refer to FIG. 8 to FIG. 9). More specifically, the second separating plate 117 may be inclinedly mounted such that a first end portion toward the compressing part 112 is higher than a second end portion.

Accordingly, when the refrigerant not evaporated to be in the liquid state in the upper space 116a is located above the second separating plate 117, the refrigerant in the liquid state may smoothly flow to the lower space 116b along the inclined second separating plate 117 by its own weight and gravitation.

By the second separating plate 117, the refrigerant in the gas state may be located in the upper space 116a, and the refrigerant in the liquid state may be located in the lower space 116b, thereby to prevent/reduce the refrigerant in the liquid state from flowing to the compressor 130.

In an embodiment, the compressor 130 may be provided in the compressing part 112. The compressor 130 may be configured to compress the refrigerant drawn through the penetration hole 124a formed on the second partition wall 124.

The first heat-exchanger 140 may be provided in the condensing part 114 and configured to condense a compressed refrigerant supplied from the compressor 130 by heat-exchanging with the coolant.

The first heat-exchanger 140 may include a plurality of first cooling tubes 142, a first inlet pipe 144, and a first exhaust pipe 146.

The first cooling tubes 142 may be positioned apart by a predetermined interval along the length direction in the interior of the condensing part 114. The coolant may flow through an interior of a first cooling tube 142.

The first inlet pipe 144 may communicate with the interiors of the first cooling tubes 142 in a state having penetrated the first cooling tubes 142, to supply the coolant to respective interiors of the first cooling tubes 142. The first inlet pipe 144 may protrude toward an outer side of the housing 110.

The first exhaust pipe 146 may communicate with the interiors of the first cooling tubes 142 in a state having penetrated the first cooling tubes 142, to discharge the coolant having passed through the first cooling tubes 142. The first exhaust pipe 146 may protrude toward the outer side of the housing 110.

That is, the first inlet pipe 144 and the first exhaust pipe 146 may be connected to the cooling apparatus and the HVAC module 10 positioned exterior to the thermal energy module 100 through the coolant pipe 17.

Here, the first inlet pipe 144 may be located on a first edge portion in a lower portion of the first cooling tube 142. In addition, the first exhaust pipe 146 may be located on a second edge portion in an upper portion of the first cooling tube 142, to face opposite to the first inlet pipe 144.

The coolant in the first heat-exchanger 140 drawn to the lower portions of the first cooling tubes 142 through the first inlet pipe 144 may flow to the upper portion of the first cooling tube 142 toward the first exhaust pipe 146.

At this time, the refrigerant drawn from the compressor 130 to the condensing part 114 may flow downward from an upper portion to a lower portion of the first heat-exchanger 140.

That is, the refrigerant drawn to the condensing part 114 may flow downward from the upper portion to the lower portion of the first cooling tube 142 through respective spaces formed between the first cooling tubes 142.

Accordingly, in the condensing part 114, flows of the refrigerant and the coolant may be formed as counterflows, and thereby heat-exchange therebetween may become efficient.

Meanwhile, the refrigerant condensed through heat-exchange with the first heat-exchanger 140 may first flow towards the first separating plate 115 positioned toward the heat-exchange space 114a, and then may be discharged to the connection hole 115a.

The refrigerant drawn to the connection hole 115a may flow upwards to the discharging hole 115b, in a space formed by the pair of the spaced-apart first separating plates 115. Thereafter, the condensed refrigerant may be discharged through the discharging hole 115b, and collected in the collecting space 114b.

In an embodiment, moisture may be removed from the refrigerant while the refrigerant passes through the dehumidifier 200.

In the present embodiment, the connection block 150 may be mounted on a position on the outer side of the housing 110 corresponding to the condensing part 114. The refrigerant supplied from the condensing part 114 may flow through the connection block 150.

That is, the connection block 150 may be mounted on an outer side lower portion of the housing 110, in a state located at a position adjacent to the second partition wall 124 in the condensing part 114. The connection block 150 may communicate with the collecting space 114b provided in the condensing part 114.

Accordingly, the connection block 150 may flow the refrigerant collected in the collecting space 114b via an internally formed passage (not shown).

In the present embodiment, the expansion valve 160 may be mounted on a position on the outer side of the housing 110 corresponding to the evaporating part 116. The expansion valve 160 may be connected to the connection block 150.

The expansion valve 160 may be configured mechanically or electronically, for example.

The expansion valve 160 may expand the refrigerant supplied through the connection block 150 and supply the expanded refrigerant to the evaporating part 116.

That is, the expansion valve 160 may be mounted on the outer side lower portion of the housing 110, in a state located at a position adjacent to the second partition wall 124 in the evaporating part 116. The expansion valve 160 may communicate with the lower space 116b provided in the evaporating part 116.

Accordingly, the expansion valve 160 may be configured to expand the refrigerant drawn through the connection block 150, and flow the expanded refrigerant to the lower space 116b of the evaporating part 116.

Meanwhile, in the present embodiment, it is described that the housing 110 is formed in a rectangle box shape, but it is not limited thereto. It may also be formed in a trapezoid shape of which a height of the first end portion where the collecting space 114b is located is lower than a height of the second end portion, in consideration of the vehicle's climbing condition, and the like.

Accordingly, when the vehicle goes up on the inclined road, the condensed refrigerant may smoothly flow to the collecting space 114 through the discharging hole 115b, and simultaneously, the refrigerant may be efficiently supplied to the expansion valve 160.

In the present embodiment, the second heat-exchanger 170 may be provided in the evaporating part 116 and configured to evaporate the refrigerant supplied from the expansion valve 160 through heat-exchanging with the coolant drawn into an interior.

The second heat-exchanger 170 may include a plurality of second cooling tubes 172, a second inlet pipe 174, and a second exhaust pipe 176.

The second cooling tubes 172 may be positioned apart by a predetermined interval along the length direction in the interior of the evaporating part 116. The coolant may flow through an interior of the second cooling tube 172.

The second inlet pipe 174 may communicate with the interiors of the second cooling tubes 172 in a state having penetrated the second cooling tubes 172, to supply the coolant to respective interiors of the second cooling tubes 172. The second inlet pipe 174 may protrude toward the outer side of the housing 110.

The second exhaust pipe 176 may communicate with the interiors of the second cooling tubes 172 in a state having penetrated the second cooling tubes 172, to discharge the coolant having passed through the second cooling tubes 172. The second exhaust pipe 176 may protrude toward the outer side of the housing 110.

That is, the second inlet pipe 174 and the second exhaust pipe 176 may be connected to the cooling apparatus and the HVAC module 10 positioned exterior to the thermal energy module 100 through the coolant pipe 17.

The second inlet pipe 174 may be located on the first edge portion in an upper portion of the second cooling tube 172. In addition, the second exhaust pipe 176 may be located on the second edge portion in a lower portion of the second cooling tube 172, to face opposite to the second inlet pipe 174.

The coolant in the second heat-exchanger 170 drawn to the upper portions of the second cooling tubes 172 through the second inlet pipe 174 may flow to the lower portions of the second cooling tubes 172 toward the second exhaust pipe 176.

The refrigerant drawn from the expansion valve 160 to the evaporating part 116 may flow upward from a lower portion to an upper portion of the second heat-exchanger 170.

That is, the refrigerant drawn to the evaporating part 116 may flow upward from the lower portion of the second cooling tube 172 to the second separating plate 117 through respective spaces formed between the second cooling tubes 172.

Accordingly, in the evaporating part 116, flows of the refrigerant and the coolant may be formed as counterflows, and thereby heat-exchange therebetween may become efficient.

The refrigerant not evaporated to be in the liquid state in the upper space 116a may smoothly flow from the upper portion of the second separating plate 117 to the lower space 116b along the inclined second separating plate 117 by its own weight and gravitation.

Therefore, among the refrigerant evaporated in the evaporating part 116 by an operation of the second heat-exchanger 170, the refrigerant in the gas state may flow from the upper space 116a to the compressing part 112 through the penetration hole 124a.

Meanwhile, in the present embodiment, it is described that, in order to form counterflows of the coolant and the refrigerant, the second inlet pipe 174 may be located in the upper portion of the second cooling tube 172, and the second exhaust pipe 174 may be located in the lower portion of the second cooling tube 172, but it is not limited thereto. Positions of the second inlet pipe 174 and the second exhaust pipe 176 may be changed depending on a mounting position of the expansion valve 160.

In addition, in the present embodiment, it is described that the second heat-exchanger 170 is employed in a single quantity, but it is not limited thereto. The second heat-exchanger 170 may be provided in the evaporating part 116 in a quantity of two for cooling the vehicle interior and for cooling the battery module, for example.

That is, the coolant for cooling the battery module may pass through one heat-exchanger, and the coolant for cooling the vehicle interior may pass through another heat-exchanger.

In this case, the refrigerant drawn to the evaporating part 116 through the expansion valve 160 may be primarily evaporated while passing through one heat-exchanger, and secondarily evaporated while passing through the other heat-exchanger, to be drawn to the compressing part 112.

In the present embodiment, a guider 180 may be mounted between the partition wall 120 and the cover 190 in an upper portion of the partition wall 120, to interconnect the compressing part 112 and condensing part 114, and configured to flow the refrigerant compressed in the compressor 130 to the condensing part 114.

The guider 180 may have open upper and lower surfaces, and may be formed as a generally "L" shaped closed curve having a predetermined height.

The guider 180 may prevent the refrigerant discharged to the upper portion of the compressor 130, above the third partition wall 126, from being drawn to the evaporating part 116. At the same time, the guider 180 may guide the refrigerant discharged in the compressor 130 to smoothly flow to the condensing part 114.

In addition, the cover 190 may be mounted on the open first surface of the housing 110, and can close and seal the interior of the housing 110.

In addition, the cover 190 may prevent exterior exposal of the compressor 130, the first heat-exchanger 140, and the second heat-exchanger 170 provided in the interior of the housing 110.

Here, the housing 110, the partition walls 120, and the cover 190 may be formed of a heat shielding material to prevent/reduce the interiorly circulating refrigerant from heat-exchanging with the exterior.

Hereinafter, operation and action of the thermal energy module 100 for a vehicle according to an exemplary embodiment may be configured as described above in detail with reference to FIG. 11 to FIG. 15.

The flow of the refrigerant in the thermal energy module 100 are described in detail with reference to FIG. 11.

Figure 11:
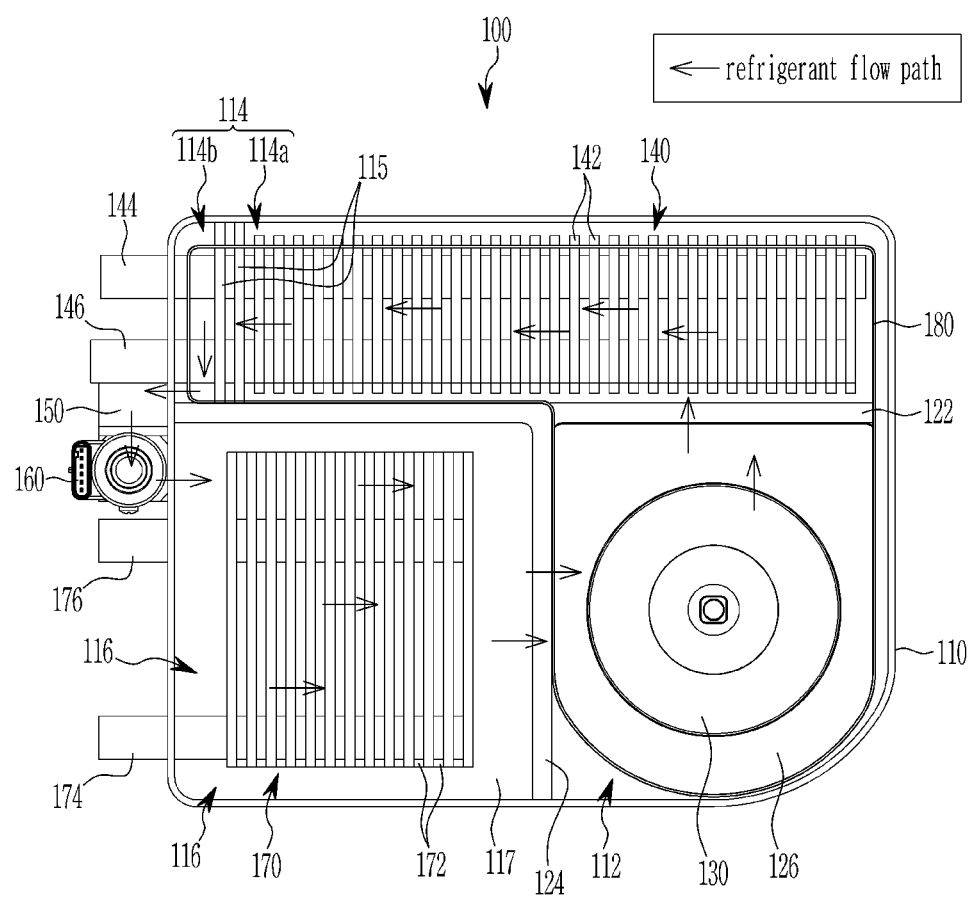
FIG. 11 is an operation diagram showing the flow of the refrigerant in a thermal energy module for a vehicle according to an exemplary embodiment.

FIG. 11 is an operation diagram showing the flow of the refrigerant in a thermal energy module 100 for a vehicle according to an exemplary embodiment.

Referring to FIG. 11, the compressing part 112, the condensing part 114, and the evaporating part 116 in the interior of the housing 110 may maintain the state of being filled with the refrigerant.

In such a state, when the compressor 130 is operated, the refrigerant discharged from the upper portion of the compressor 130 to above the third partition wall 126 flows to the condensing part 114 by the guider 180.

The refrigerant having flown to the condensing part 114 is first condensed in the heat-exchange space 114a by an operation of the first heat-exchanger 140 provided in the condensing part 114, and then flows to the collecting space 114b.

The refrigerant collected in the collecting space 114b is drawn to the expansion valve 160 connected through the connection block 150. In addition, the refrigerant expanded in the expansion valve 160 is drawn to the evaporating part 116.

The refrigerant drawn to the evaporating part 116 is evaporated by the operation of the second heat-exchanger 170 provided in the evaporating part 116. Among the refrigerant evaporated in the evaporating part 116, the gaseous refrigerant is drawn to the compressing part 112 through the penetration hole 124a formed on the second partition wall 124 in the upper space 116a.

The refrigerant drawn to the compressing part 112 is compressed while passing through the compressor 130, the compressed refrigerant may be drawn back to the condensing part 114.

That is, while repetitively performing the above-described processes, the thermal energy module 100 circulates the refrigerant filled in the housing 110, and the temperature of the coolant circulating the first heat-exchanger 140 and the second heat-exchanger 170 may be changed by using the thermal energy generated by phase-changing of the refrigerant.

In the present embodiment, flows of the refrigerant and the coolant in the condensing part 114 are described in detail with reference to FIG. 12 to FIG. 13.

Figure 12:
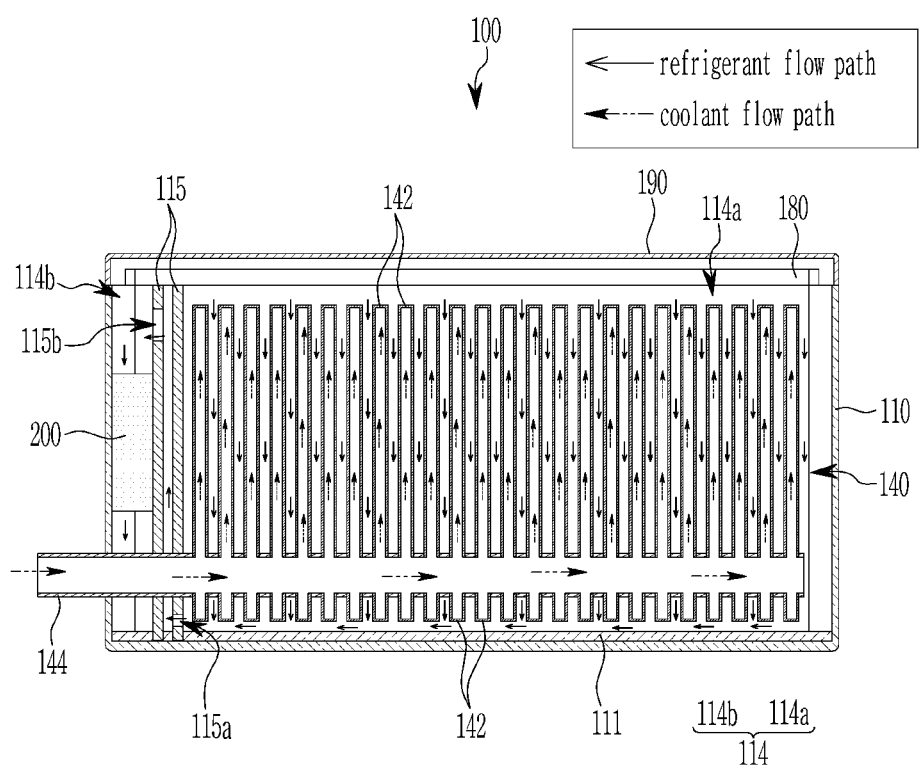
FIG. 12 and FIG. 13 are operation diagrams showing the flow of the refrigerant and the coolant in a condensing part applied to a thermal energy module for a vehicle according to an exemplary embodiment.
Figure 13:
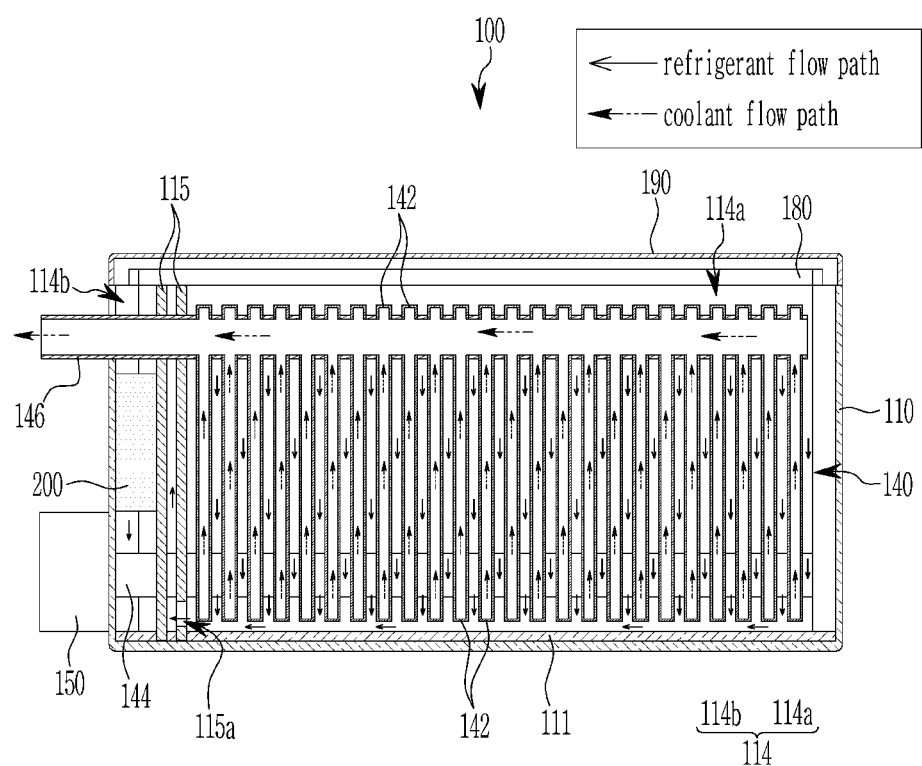

FIG. 12 and FIG. 13 are operation diagrams showing the flow of the refrigerant and the coolant in a condensing part applied to a thermal energy module for a vehicle according to an exemplary embodiment.

Referring to FIG. 12 and FIG. 13, the refrigerant drawn to the compressor 130 in the compressing part 112 is compressed by an operation of the compressor 130. The refrigerant compressed in the compressor 130 is drawn to the upper portion of the condensing part 114 by the guider 180.

The compressed refrigerant drawn to the upper portion of the condensing part 114 flow downward from the upper portion to the lower portion of the first cooling tube 142 through respective spaces formed between the first cooling tubes 142.

The coolant in the first heat-exchanger 140 drawn to the lower portions of the first cooling tubes 142 through the first inlet pipe 144 may flow to the upper portion of the first cooling tube 142 toward the first exhaust pipe 146.

Accordingly, in the condensing part 114, flows of the refrigerant and the coolant are formed as counterflows, and thereby heat-exchange therebetween may become efficient.

Meanwhile, the refrigerant condensed through heat-exchange with the first heat-exchanger 140 first flows toward the first separating plate 115 positioned toward the heat-exchange space 114a, and then is discharged to the connection hole 115a.

The refrigerant drawn to the connection hole 115a flows upward to the discharging hole 115b, in a space formed by the pair of the spaced-apart first separating plates 115. Thereafter, the condensed refrigerant may be discharged through the discharging hole 115b, and collected in the collecting space 114b.

In an embodiment, moisture may be removed/reduced from the refrigerant drawn to the collecting space 114b while the refrigerant passes through the dehumidifier 200.

The refrigerant from which moisture is removed/reduced may flow to the expansion valve 160 through the connection block 150.

While repetitively performing such operations, the condensing part 114 is configured to condense the refrigerant supplied from the compressor 130 through heat-exchange with the coolant circulating in the first heat-exchanger 140, and supply the thermal energy generated during the condensation of the refrigerant to the coolant to increase the temperature of the coolant.

Accordingly, when the heating mode of the vehicle is operated, the high-temperature coolant heat-exchanged while passing through the first heat-exchanger 140 in the condensing part 114 may be supplied to the internal heater 11 of the HVAC module 10 to heat the vehicle interior.

In the present embodiment, flows of the refrigerant and the coolant in the evaporating part 116 are described in detail with reference to FIG. 14 to FIG. 15.

Figure 14:
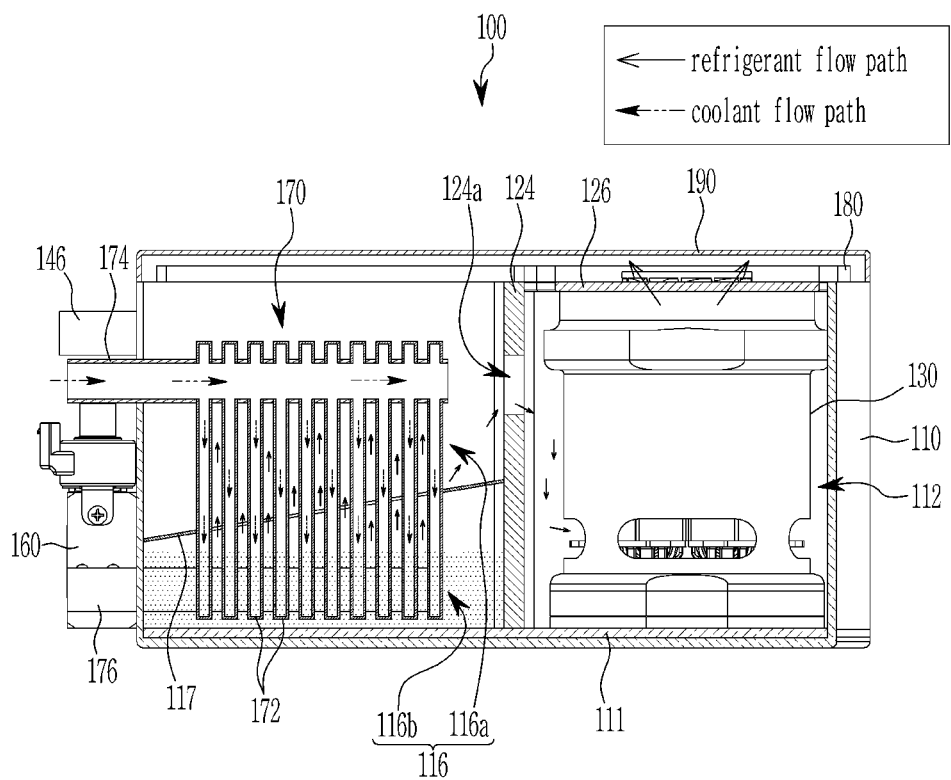
FIG. 14 and FIG. 15 are operation diagrams showing the flow of the refrigerant and the coolant in an evaporating part applied to a thermal energy module for a vehicle according to an exemplary embodiment.
Figure 15:
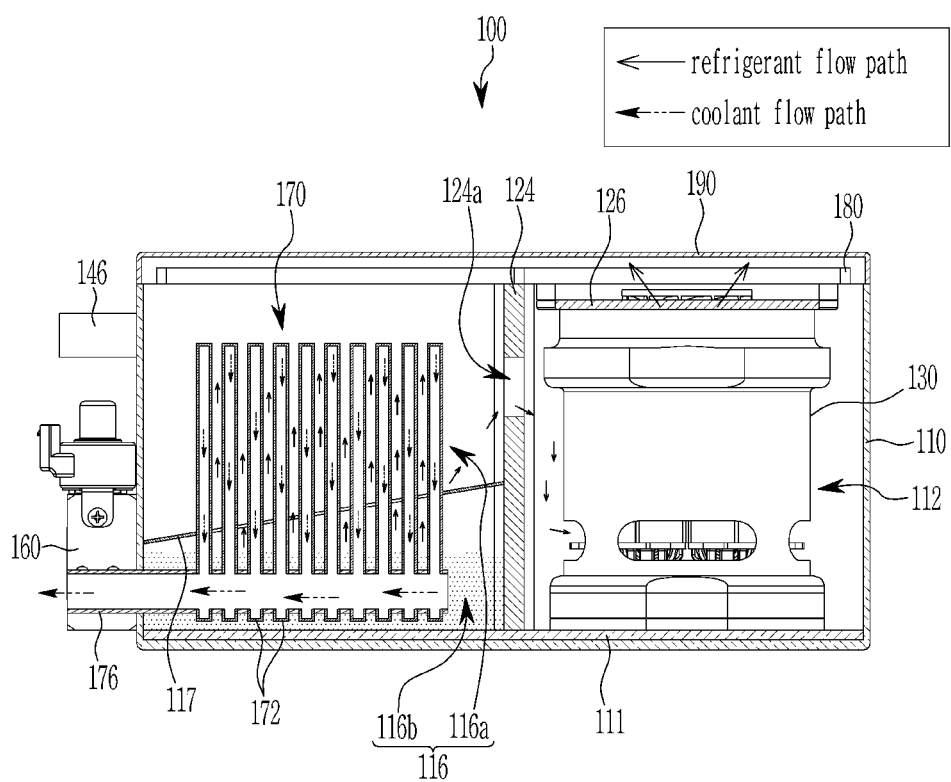

FIG. 14 and FIG. 15 are operation diagrams showing the flow of the refrigerant and the coolant in an evaporating part applied to a thermal energy module for a vehicle according to an exemplary embodiment.

The refrigerant expanded in the expansion valve 160 is drawn from the lower portion of the second heat-exchanger 170, in the evaporating part 116, to the lower space 116b.

The refrigerant drawn into the lower space 116b may flow upward from the lower portion of the second cooling tube 172 to the second separating plate 117 through respective spaces formed between the second cooling tubes 172.

At this time, the coolant in the second heat-exchanger 170 drawn to the upper portions of the second cooling tubes 172 through the second inlet pipe 174 may flow to the lower portions of the second cooling tubes 172 toward the second exhaust pipe 176.

Accordingly, in the evaporating part 116, flows of the refrigerant and the coolant are formed as counterflows, and thereby heat-exchange therebetween may become efficient.

The refrigerant not evaporated to be in the liquid state in the upper space 116a flows from the upper portion of the second separating plate 117 to the lower space 116b along the inclined second separating plate 117 by its own weight and gravitation.

In addition, among the refrigerant evaporated in the evaporating part 116 by the operation of the second heat-exchanger 170, the refrigerant in the gas state flows from the upper space 116a to the compressing part 112 through the penetration hole 124a.

While repetitively performing such operations, the evaporating part 116 is configured to evaporate the refrigerant supplied from the expansion valve 160 through heat-exchange with the coolant circulating in the second heat-exchanger 170, and supply the thermal energy of the low temperature generated during the evaporation of the refrigerant to the coolant to cool the coolant.

Accordingly, when the cooling mode of the vehicle is operated, the low-temperature coolant having heat-exchanged in the evaporating part 116 while passing through the second heat-exchanger 170 may be supplied to the cooler 13 of the HVAC module 10 to cool the vehicle interior.

Therefore, according to the thermal energy module 100 for a vehicle according to an exemplary embodiment, the thermal energy generated by the refrigerant during the condensation and evaporation of the refrigerant may be selectively heat-exchanged with the coolant, and the vehicle interior temperature may be adjusted by using the heat-exchanged low-temperature or high-temperature coolant, thereby capable of streamlining the entire system.

In addition, in an embodiment of the present disclosure, by interiorly circulating the refrigerant without a separate connection pipe to minimize pressure loss that may occur due to flowing of the refrigerant, the thermal energy loss occurring in phase-changing of the refrigerant may be minimized, and the efficiency of the entire system may be enhanced.

In addition, according to an embodiment, it may be possible to reduce manufacturing cost and weight through modularization of an apparatus, and to improve space utilization.

While embodiments has been described in connection with what is presently considered to be practical, it is to be understood that the present disclosure is not limited to the disclosed embodiments. On the contrary, it is intended to cover various modifications and equivalent arrangements included within the spirit and scope of the appended claims.

The following reference numerals can be used in conjunction with the drawings:

10: HVAC module
11: internal heater
13: cooler
15: opening/closing door
100: thermal energy module
110: housing
111: base plate
112: compressing part
114: condensing part
115: first separating plate
116: evaporating part
117: second separating plate
120: partition wall
122, 124, 126: first, second, and third partition walls
130: compressor
140: first heat-exchanger
150: connection block
160: expansion valve
170: second heat-exchanger
180: guider
190: cover

What is claimed is:

1. A thermal energy module for a vehicle, comprising:
a housing having an open first surface, the housing configured to be filled with a refrigerant;
partition walls partitioning an interior of the housing into a compressing part, a condensing part, and an evaporating part, wherein the partition walls are mounted on a base plate, the base plate being mounted on a bottom surface in the interior of the housing;
a compressor provided in the compressing part;
a first heat-exchanger provided in the condensing part and configured to receive the refrigerant filled in the housing from the compressor and condense the refrigerant by heat-exchange with a coolant;
an expansion valve mounted on an outer side of the housing and configured to receive the refrigerant from the condensing part, expand the refrigerant, and supply the refrigerant to the evaporating part;
a second heat-exchanger provided in the evaporating part and configured to receive the refrigerant from the expansion valve and evaporate the refrigerant through heat-exchange with the coolant; and
a cover mounted on the open first surface of the housing and configured to close and seal the interior of the housing.

2. The thermal energy module of claim 1, wherein the first heat-exchanger comprises:
first cooling tubes positioned apart at intervals along a length direction in an interior of the condensing part, and configured to interiorly flow the coolant;
a first inlet pipe protruding toward the outer side of the housing and configured to communicate with interiors of the first cooling tubes to supply the coolant to the interiors of the first cooling tubes; and
a first exhaust pipe protruding toward the outer side of the housing and configured to communicate with the interiors of the first cooling tubes to discharge the coolant having passed through the first cooling tubes.

3. The thermal energy module of claim 2, wherein:
the first inlet pipe is located on a first edge portion in a lower portion of the first cooling tube; and
the first exhaust pipe is located on a second edge portion in an upper portion of the first cooling tube, to face opposite to the first inlet pipe.

4. The thermal energy module of claim 1, wherein the second heat-exchanger comprises:
second cooling tubes positioned apart at intervals along a length direction in an interior of the evaporating part, and configured to interiorly flow the coolant;
a second inlet pipe protruding toward the outer side of the housing and configured to communicate with interiors of the second cooling tubes to supply the coolant to the interiors of the second cooling tubes; and
a second exhaust pipe protruding toward the outer side of the housing and configured to communicate with the interiors of the second cooling tubes to discharge the coolant having passed through the second cooling tubes.

5. The thermal energy module of claim 4, wherein:
the second inlet pipe is located on a first edge portion in an upper portion of the second cooling tube; and
the second exhaust pipe is located on a second edge portion in a lower portion of the second cooling tube, to face opposite to the second inlet pipe.

6. The thermal energy module of claim 1, wherein the housing, the cover, and the partition wall are formed of a heat shielding material.

7. The thermal energy module of claim 1, wherein the cover is configured to prevent the refrigerant from being leaked to an outside of the housing and the refrigerant is configured to interiorly circulate to sequentially pass through the compressing part, the condensing part, the expansion valve, and the evaporating part.

8. The thermal energy module of claim 1, wherein:
the first heat-exchanger and the second heat-exchanger are connected to an HVAC module through a coolant pipe; and
the high-temperature coolant having heat-exchanged while passing through the first heat-exchanger is supplied to the HVAC module to heat the vehicle interior when a heating mode of a vehicle interior is executed.

9. The thermal energy module of claim 8, wherein the low-temperature coolant having heat-exchanged while passing through the second heat-exchanger is supplied to the HVAC module to cool the vehicle interior when a cooling mode of the vehicle interior is executed.

10. A thermal energy module for a vehicle of claim 1, comprising:
a housing having an open first surface, the housing configured to be filled with a refrigerant;
partition walls partitioning an interior of the housing into a compressing part, a condensing part, and an evaporating part, wherein the partition walls comprise:

a first partition wall formed along a length direction of the housing and configured to partition the interior of the housing in a width direction to form the condensing part;

a second partition wall formed along the width direction of the housing from the first partition wall, and configured to partition the interior of the housing in the length direction to form the compressing part and the evaporating part; and a third partition wall formed to interconnect upper portions of the first partition wall and the second partition wall in the compressing part;

a compressor provided in the compressing part;

a first heat-exchanger provided in the condensing part and configured to receive the refrigerant filled in the housing from the compressor and condense the refrigerant by heat-exchange with a coolant;

an expansion valve mounted on an outer side of the housing and configured to receive the refrigerant from the condensing part, expand the refrigerant, and supply the refrigerant to the evaporating part;

a second heat-exchanger provided in the evaporating part and configured to receive the refrigerant from the expansion valve and evaporate the refrigerant through heat-exchange with the coolant; and a cover mounted on the open first surface of the housing and configured to close and seal the interior of the housing.

11. The thermal energy module of claim 10, wherein a penetration hole is formed in the upper portion of the second partition wall, configured to allow the refrigerant to flow from the evaporating part to the compressing part.

12. The thermal energy module of claim 10, wherein the condensing part further comprises at least one first separating plate mounted in an opposite side of the housing relative to the compressing part and configured to partition the condensing part into a heat-exchange space and a collecting space with respect to the length direction of the housing.

13. The thermal energy module of claim 12, wherein the at least one first separating plate is configured as a pair of first separating plates positioned apart from each other thereby being configured to allow the refrigerant to flow between the pair of first separating plates.

14. The thermal energy module of claim 13, wherein:

among the pair of first separating plates, a lower portion of one first separating plate positioned toward the compressor is formed with a connection hole configured to draw the refrigerant from the heat-exchange space; and an upper portion of another first separating plate among the pair of first separating plates is formed with a discharging hole configured to discharge the refrigerant to the collecting space.

15. The thermal energy module of claim 12, further comprising a dehumidifier located in the collecting space, the dehumidifier being configured to remove at least some moisture from the refrigerant drawn from the heat-exchange space.

16. The thermal energy module of claim 10, wherein the evaporating part further comprises a second separating plate mounted between the first partition wall and the second partition wall and configured to partition the evaporating part into an upper space and a lower space with respect to a height direction of the housing.

17. The thermal energy module of claim 16, wherein the second separating plate comprises an insertion hole formed in a central region so that the second heat-exchanger can be inserted into the second separating plate.

18. The thermal energy module of claim 16, wherein the second separating plate is inclinedly mounted within the evaporating part; and wherein the second separating plate is configured to separate the refrigerant in the gas state is located in the upper space, and the refrigerant in the liquid state is located in the lower space, thereby hindering the refrigerant in the liquid state from flowing to the compressor.

19. The thermal energy module of claim 10, wherein the partition walls are mounted on a base plate, the base plate being mounted on a bottom surface in the interior of the housing.

20. A thermal energy module for a vehicle, comprising:

a housing having an open first surface, the housing configured to be filled with a refrigerant;

partition walls partitioning an interior of the housing into a compressing part, a condensing part, and an evaporating part;

a compressor provided in the compressing part;

a first heat-exchanger provided in the condensing part and configured to receive the refrigerant filled in the housing from the compressor and condense the refrigerant by heat-exchange with a coolant;

an expansion valve mounted on an outer side of the housing and configured to receive the refrigerant from the condensing part, expand the refrigerant, and supply the refrigerant to the evaporating part;

a second heat-exchanger provided in the evaporating part and configured to receive the refrigerant from the expansion valve and evaporate the refrigerant through heat-exchange with the coolant;

a cover mounted on the open first surface of the housing and configured to close and seal the interior of the housing; and a guider located between the partition walls and the cover, the guider being configured to interconnect the compressing part and condensing part, and configured to allow the refrigerant to flow from the compressor to the condensing part.

* * * * *